CATHODE RAY TUBE BRIGHTNESS CONTROL CIRCUITRY

Filed March 24, 1969

INVENTORS
ELMER O. STONE &
MARTIN L. ZELENZ
BY
Donald R. Castle
ATTORNEY

United States Patent Office 3,534,220
Patented Oct. 13, 1970

3,534,220

CATHODE RAY TUBE BRIGHTNESS CONTROL CIRCUITRY

Elmer O. Stone and Martin L. Zelenz, Seneca Falls, N.Y., assignors to Sylvania Electric Products Inc., a corporation of Delaware Filed Mar. 24, 1969, Ser. No. 809,591
Int. Cl. H01j *29/52*
U.S. Cl. 315—30 8 Claims

ABSTRACT OF THE DISCLOSURE

A cathode ray tube system includes brightness control circuitry wherein the cathode electrode of a cathode ray tube is coupled to a negative potential source and the grid electrode of the cathode ray tube is coupled via an amplifier and voltage divider means to an alterable DC potential source whereby variations in the alterable DC potential source vary the bias potential and brightness of the cathode ray tube.

BACKGROUND OF THE INVENTION

In cathode ray tube systems and particularly in cathode ray tube systems of the electrostatic deflection type frequently employed with oscilloscopes and similar types of test apparatus, it is common practice to provide a negative potential source and to couple the cathode electrode of a cathode ray tube to the negative potential source. The deflection electrodes, whereat relatively high frequency test signals are applied, may then be referenced to circuit ground potential. Thus, this highly desirable, relatively low potential level of the deflection electrodes permits employment of relatively inexpensive components and apparatus for application thereto of the test signals.

In the known prior art it has been a common practice to provide a brightness control for the cathode ray tube by electrically isolating an alterable resistor and coupling the alterable resistor intermediate the cathode and grid electrodes of the cathode ray tube. Since the cathode electrode of the cathode ray tube is coupled to a negative potential source, the alterable resistor is undesirably subjected to a relatively high negative potential. Moreover, a shaft of electrical insulating material must be employed to permit operator adjustment of the control without adverse affects on the operator. Thus, the known technique for brightness control of the cathode ray tube included an electrically isolated alterable component subjected to relatively high potentials, a shaft of electrical insulating material, and accessibility of mechanical linkage to the alterable component.

OBJECTS AND SUMMARY OF THE INVENTION

Therefore, it is an object of the present invention to provide enhanced brightness control circuitry for a cathode ray tube system. Another object of the invention is to provide improved brightness control circuitry for a cathode ray tube system wherein the control is suitable to remote location and electronic coupling to a cathode ray tube. Still another object of the invention is to provide enhanced brightness control circuitry wherein variations in brightness level of a cathode ray tube are substantially independent of variations in a negative potential source coupled to the cathode ray tube.

These and other objects, capabilities and advantages are achieved in one aspect of the invention by brightness control circuitry in a cathode ray tube system wherein the cathode electrode of a cathode ray tube is coupled to a negative potential source and a grid electrode is coupled via an amplifier means and voltage divider means to an alterable DC potential source whereby varying the DC potential source varies the bias and the brightness of the cathode ray tube.

DESCRIPTION OF THE PREFERRED EMBODIMENTS

Figure 1:
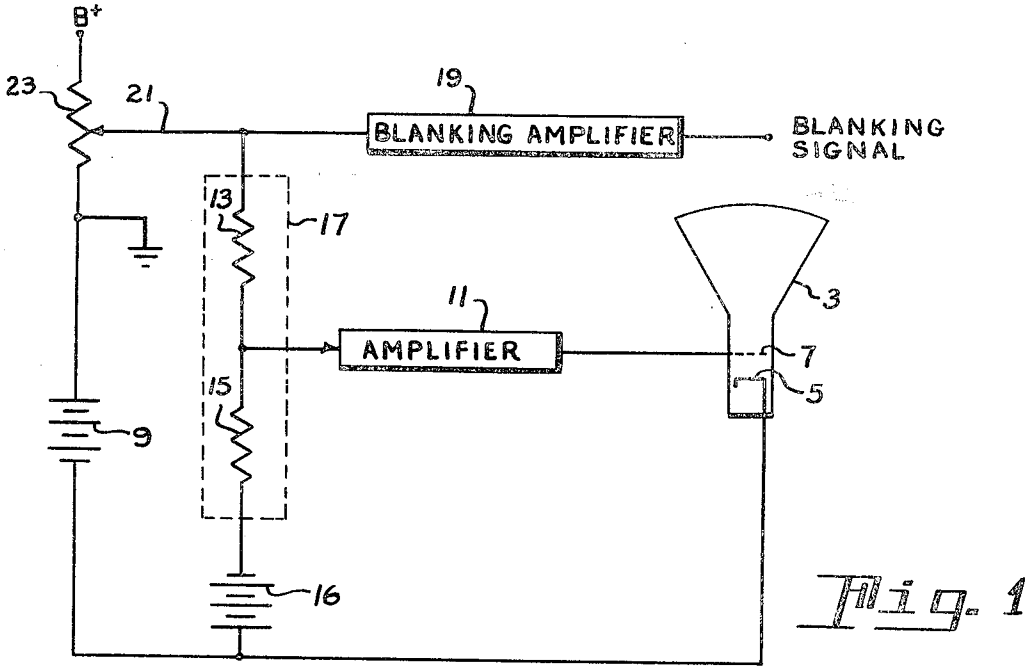
FIG. 1 illustrates, in block and schematic form, brightness control circuitry for a cathode ray tube system.

Referring to FIG. 1 of the drawings, brightness control circuitry for a cathode ray tube system includes a cathode ray tube 3 having at least one cathode electrode 5 and at least one grid electrode 7. The cathode electrode 5 is coupled to a negative potential source 9 which can have a value of about 3 kv. and which, in turn, is connected to a potential reference level such as circuit ground.

The grid electrode 7 is coupled to an amplifier stage 11 which, in turn, is coupled to the junction of first and second series connected resistors 13 and 15 forming a voltage divider means 17. The second resistor 15 of the voltage divider means 17 is coupled to the cathode electrode 5 of the cathode ray tube 3 via a potential source 16, normally about 30 volts DC. The first resistor 13 of the voltage divider means 17 is coupled to a blanking signal amplifier stage 19 connected to a blanking signal source and to the adjustable arm 21 of an alterable resistor 23. The alterable resistor 23, forming the brightness control, is coupled to a DC potential source B+, 300 volts DC for instance, and to a potential reference level such as circuit ground.

As to operation, the first and second series connected resistors, 13 and 15, are preferably in the ratio of about 100:1 respectively. Thus, the negative potential source 9 coupled to the cathode electrode 5 of the cathode ray tube 3 is, for all practical purposes, electronically isolated from the alterable resistor 23 or brightness control and the blanking signal source by the voltage divider means 17.

Since the DC potential source in the form of the DC source B+ and the alterable resistor 23 are isolated from the negative potential source 9, the adjustable arm 21 of the alterable resistor 23 can be varied to cause application of a potential variation to the voltage divider means 17. In turn, the voltage divider means 17 selects a portion of this potential variation, about one one-hundredth, and applies this selected portion of the potential variation to the amplifier stage 11.

The amplifier stage 11 preferably, not necessarily, has an amplification factor of about one hundred. Thus, the selected portion of the variation in potential applied to the amplifier stage 11, which is about one one-hundredth of the potential variation applied to the voltage divider means 17, is amplified about one hundred times by the amplifier stage 11 and applied to the grid electrode 7 of the cathode ray tube 3.

As a specific example, the adjustable arm 21 is varied such that a 30 volts change in potential is applied to the voltage divider means 17. The voltage divider means 17 will select about one one-hundredth of this variation or about 0.3 volt for application to the amplifier stage 11. Therein, the applied 0.3 volt will be amplified approximately one hundred times to provide the original 30 volts variation which is applied to the grid electrode 7 of the cathode ray tube 3.

Additionally, it should perhaps be noted that a blanking signal available from a blanking signal source is also applicable via the blanking amplifier stage 19 to the voltage divider means 17, and in turn, to the amplifier stage 11 and the grid electrode 7 of the cathode ray tube 3. Thus, the blanking signal undergoes substantially the same initial reduction and subsequent increase in magnitude as described with respect to a potential variation available from the alterable resistor 23. Moreover, the apparatus associated with the development of the blanking signals is also substantially isolated from the negative potential source 9 by the voltage divider means 17.

Figure 2:
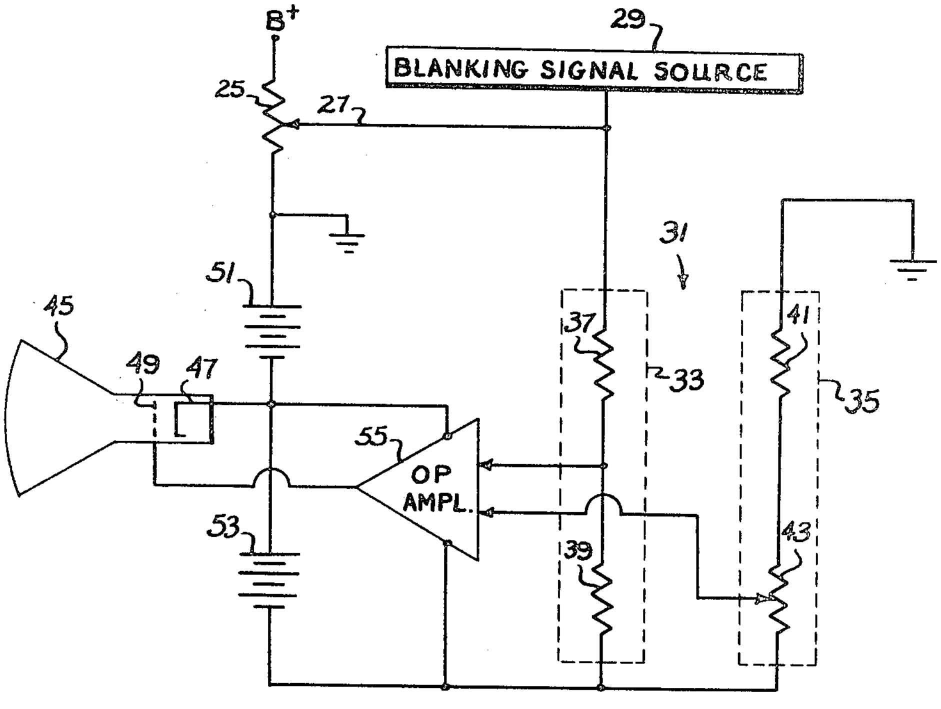
FIG. 2 illustrates, in block and schematic form, a preferred form of brightness control circuitry wherein differential type control means is employed to negate variations in a negative potential source.

Referring to FIG. 2, a preferred form of brightness control circuitry suitable for a cathode ray tube system includes a DC potential source B+ coupled to a potential reference level such as circuit ground by an alterable resistor 25 having an adjustable arm 27. The adjustable arm 27 is coupled to a video signal source 29 and to a voltage divider means 31.

The voltage divider means 31 includes a first circuit network 33 and a second circuit network 35. The first circuit network 33 is coupled to the adjustable arm 27 and has first and second series connected resistors 37 and 39 respectively. The second circuit network 35 is coupled to circuit ground and includes first and second series connected resistors 41 and 43 respectively with resistor 43 preferably alterable.

A cathode ray tube 45 includes a cathode electrode 47 and a grid electrode 49. The cathode 47 is connected to a negative potential source 51 coupled to the potential reference level or circuit ground and via a second potential source 53 to the voltage divider means 31. An operational amplifier 55 is shunt coupled across the second potential source 53. This operational amplifier 55 is coupled to the first and second circuit networks 33 and 35 of the voltage divider means 31 and to the grid electrode 49 of the cathode ray tube 45.

As to operation, the first and second series connected resistors 37 and 39 of the first circuit network 33 are preferably in the ratio of about one hundred to one respectively. Similarly, the first and second series connected resistors 41 and 43 of the second circuit network 35 are in the ratio of about one hundred to one respectively. Thus, the alterable resistor 25 and the video source 29 are for all practical purposes isolated by the impedance of the first circuit network 33 from the effects of the negative potential source 51 connected to the cathode electrode 47 of the cathode ray tube 45.

Also, a potential is applied to the operational amplifier 55 from the first circuit network 33 and from the second circuit network 35. As is well known, these input potentials are readily balanced by the alterable resistor 43 such that the operational amplifier 55 is responsive to provide an output signal dependent upon the difference in potential available from the circuit networks 33 and 35 respectively. Moreover, the fact that both circuit networks 33 and 35 are coupled to the negative potential source 51 renders any shift in potential therefrom applicable to both circuit networks 33 and 35. Thus, the operational amplifier 55 is substantially unaffected by a shift in the negative potential source 51 since both input potentials to the operational amplifier 55 are affected in substantially equal amounts thereby cancelling one another.

Therefore, a variation in the adjustable arm 27 of the alterable resistor 25 causes a variation in the potential applied to the first circuit network 33. A portion of this applied variation, about one one-hundredth, is applied to the operational amplifier 55. This variation in potential from the first circuit network 33 is compared with the substantially constant potential available from the second circuit network 35 to provide a resultant signal difference. This signal difference is amplified, about one hundred times, in the operational amplifier 55 and applied to the grid electrode 49 of the cathode ray tube 45.

Thus, there has been provided brightness control circuitry wherein the controls are remotely locatable with respect to a cathode ray tube. Also, the circuitry provides electronic isolation of the brightness controls and cathode ray tube in a manner unavailable in other known cathode ray tube systems. Moreover, the system is simple and inexpensive as compared with other known techniques of brightness control isolation.

While there has been shown and described what is at present considered the preferred embodiments of the invention, it will be obvious to those skilled in the art that various changes and modifications may be made therein without departing from the invention as defined by the appended claims.

What is claimed is:

1. In a cathode ray tube system, brightness control circuitry comprising in combination:

a cathode ray tube having at least one cathode electrode and one grid electrode;

means for providing an alterable DC potential including a series connected DC potential source and an alterable impedance;

a negative potential source coupled intermediate said cathode electrode of said cathode ray tube and said alterable impedance of said means for providing a DC potential source;

voltage divider means substantially shunting said negative potential source and at least a portion of said alterable impedance; and an amplifier coupling said voltage divider means to said grid electrode of said cathode ray tube whereby a shift in said alterable impedance causes a shift in DC potential derived from said voltage divider means and applied to said amplifier and to said grid electrode of said cathode ray tube.

2. The combination of claim 1 including a blanking pulse signal source coupled to the junction of said coupled voltage divider means and said means for providing an alterable DC potential.

3. The combination of claim 1 wherein said voltage divider means includes a first voltage divider network coupled to said means for providing an alterable DC potential and a second voltage divider network coupled to a potential reference level and said amplifier is in the form of an operational amplifier coupling said first and second voltage divider networks to said grid electrode of said cathode ray tube.

4. The combination of claim 1 wherein said means for providing an alterable DC potential is in the form of a DC potential source coupled to a potential reference level by an alterable impedance having an adjustable arm coupled to said voltage divider means.

5. The combination of claim 1 wherein said voltage divider means includes a first voltage divider network coupled to said means for providing an alterable DC potential and having first and second series connected impedances.

6. The combination of claim 5 wherein said first and second series connected impedances are in the ratio of about 100:1.

7. The combination of claim 3 wherein said first and second voltage divider networks each include a pair of series connected resistors with said operational amplifier coupled to the junction of each of said pairs of series connected resistors.

8. The combination of claim 3 including a second DC potential source means coupled to said negative potential source means and in shunt connection with said operational amplifier.

References Cited

UNITED STATES PATENTS

| | | | |
|---|---|---|---|
| 3,168,679 | 2/1965 | Kobbe | 315—30 |
| 3,403,291 | 9/1968 | Lazarchick | 315—30 |
| 3,134,046 | 5/1964 | Walton | 315—30 |

RODNEY D. BENNETT, Jr., Primary Examiner

J. G. BAXTER, Assistant Examiner